United States Patent [19]

Gebert et al.

[11] 4,422,790

[45] Dec. 27, 1983

[54] CONNECTING MEANS FOR FILTER CARTRIDGES

[75] Inventors: Hans Gebert, Heilbronn; Manfred Löffelhardt, Obersulm; Gerhard Obernosterer, Öhringen-Ohrnberg, all of Fed. Rep. of Germany

[73] Assignee: Knecht Filterwerke GmbH, Stuttgart, Fed. Rep. of Germany

[21] Appl. No.: 361,881

[22] Filed: Mar. 25, 1982

[30] Foreign Application Priority Data

Apr. 4, 1981 [DE] Fed. Rep. of Germany ....... 3113640

[51] Int. Cl.³ ............................................. F16B 1/00
[52] U.S. Cl. ..................................... 403/11; 403/292; 403/297; 16/225; 210/232; 285/370
[58] Field of Search ................. 403/292, 298, 11, 297, 403/24; 285/370, 397, DIG. 22, 319; 16/225, DIG. 13, 280, 286; 210/232, 338, 339, 335, 541

[56] References Cited

U.S. PATENT DOCUMENTS 2,313,307  3/1943  Wilkinson ...................... 403/297 X
3,243,206  3/1966  Samer ......................... 285/DIG. 22
3,246,920  4/1966  Pall ................................ 210/232 X

FOREIGN PATENT DOCUMENTS 1404143  5/1965  France .................................. 16/225

Primary Examiner—Andrew V. Kundrat
Assistant Examiner—Joseph A. Fischetti
Attorney, Agent, or Firm—Murray and Whisenhunt

[57] ABSTRACT

For lubricating-oil filters for combustion engines, wherein the space available for the installation and removal of the filter cartridge is very confined, there are provided, instead of one filter cartridge, at least two filter cartridges which are axially arranged in series one behind the other.

In order to allow these filter cartridges to be installed or removed without difficulties, there is proposed for the connection of these filter cartridges an articulated connecting means which ensures that the filter cartridges can be tilted relative to each other. A clip hinge or a wire or plastics-material strip, provided with clasps or detents, can be used as the connecting means.

3 Claims, 3 Drawing Figures

CONNECTING MEANS FOR FILTER CARTRIDGES

BACKGROUND TO THE INVENTION

The invention relates to means for connecting at least two filter cartridges.

For purifying the lubricating oil of internal-combustion engines, there are normally used so-called tubular filter cartridges which consist of a filter element in a suitable filter material, for example radially pleated filter paper, and whose front ends are sealingly embraced by end discs. Sleeve-shaped, perforated supporting guards, which are attached to the inside and outside circumferences of the filter element, serve for stiffening the cartridge. More especially in the case of motorcycle internal-combustion engines, the space available for the installation of the oil filters is often so small that the installation and removal of the filter cartridge, which is necessary for the filtering process and has a certain length, is only rendered possible in that the internal-combustion engine is released from its holding support or other units surrounding the oil filter are dismantled.

In connection with an oil filter whose filter cartridge cannot be removed directly vertically from the filter housing because of the confined space conditions, it is known from GB PS No. 542 339 to provide two filter cartridges which, being axially arranged in series, are rigidly connected together by a connecting means. When these rigidly connected filter cartridges are removed, the upper filter cartridge is grasped and is pulled vertically from the filter housing, during which process the lower filter cartridge is also taken along. Once the upper filter cartridge has been pulled fully from the filter housing, so that the lower filter cartridge projects from the edge of the filter housing and can be grasped, the upper filter cartridge has to be broken away in order to allow the second filter cartridge to be pulled completely from the filter housing.

This procedure during the removal of the two filter cartridges is complicated and has to be carried out with great care, for the danger exists that, when the first filter cartridge is broken off, the second filter cartridge will slip back into the filter housing and can no longer be grasped and removed or this can only be done with an additional effort.

Furthermore, it is impossible to install the two completely joined filter cartridges.

OBJECT OF THE INVENTION

It is therefore the object of the invention to find a connecting means of two filter cartridges which renders possible in a simple manner the installation and removal of the two completely joined filter cartridges.

BRIEF DESCRIPTION OF THE DRAWINGS

The invention will now be explained in more detail with reference to the drawings, in which.

DESCRIPTION OF PREFERRED EMBODIMENT

Figures 1, 3:
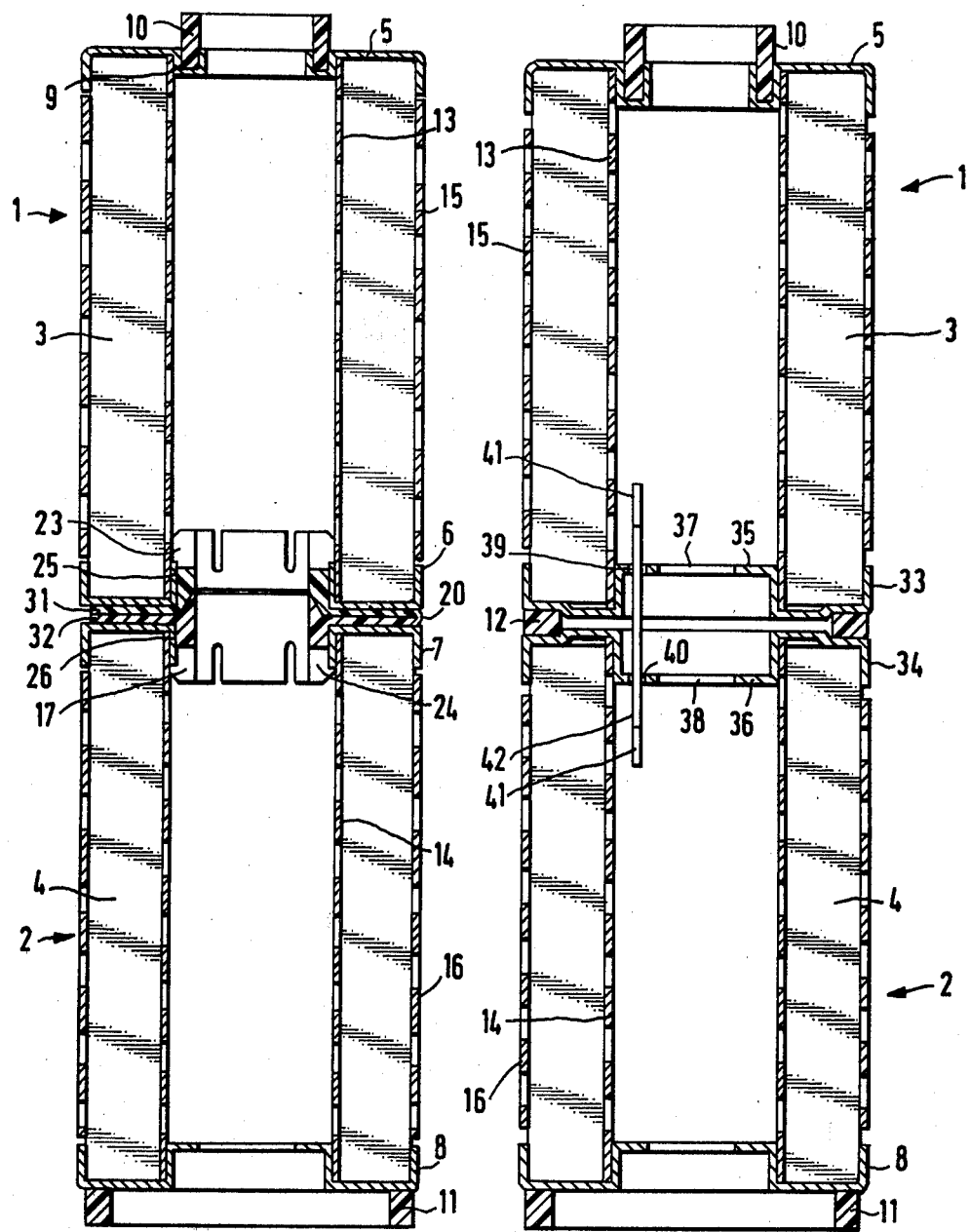
FIG. 1 shows a section of two filter cartridges, together with the clip hinge according to the invention, in the installed position.
FIG. 3 shows two filter cartridges including a wire as the connecting means according to the invention.
Figure 2:
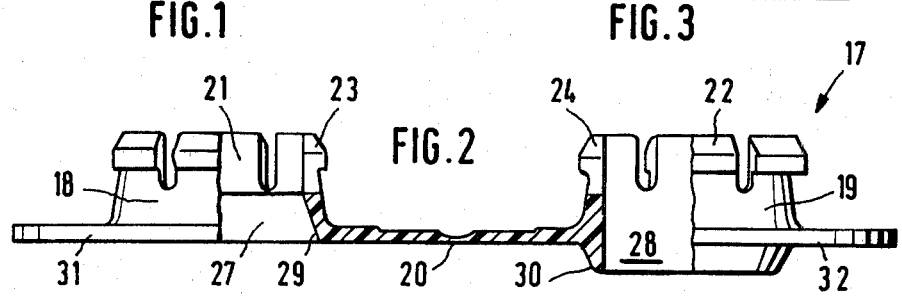
FIG. 2 shows an enlarged side view, partly in section, of the clip hinge (not installed)

In the housing (not shown) of a lubricating-oil filter, there are mounted two filter cartridges 1, 2 consisting of the filter elements 3 and 4 respectively, which are composed of radially pleated filter paper, and having end discs 5 to 8 respectively which sealingly embrace the front ends thereof, the end disc 5 of the upper filter cartridge 1 having on its internal edge an integrally formed seat 9 for a seal 10. Another seal 11 bears against the end disc 8 of the lower filter cartridge 2 and, if required, a seal 12 is provided between the two filter elements 3, 4. The filter elements 3, 4 are embraced by tubular perforated plates 13 and 14 respectively on the inside circumferences thereof and by tubular perforated plates 15 and 16 respectively on the outside circumferences thereof.

As shown in FIG. 1, the connection of the two filter cartridges 1, 2, which are axially arranged in series, is effected by means of a clip hinge 17. This clip hinge 17 comprises, as a plastics-material injection moulding, two parts 18, 19 which are connected together by means of a so-called film hinge 20. The ends 21, 22 of the two parts 18, 19 of the clip hinge 17, which ends are free in the installed state, have detents 23, 24, which spread on the circumferences thereof and embrace the end discs 6, 7 in a clip-like manner on the bent-off circumferences 25, 26 thereof. The two other ends 27, 28 of the clip hinge 17 engage in each other in the installed state. For this purpose, the part 18 has at its end 27, on its internal wall, a conically extending ring section 29 which is in operative engagement with a ring section 30 which extends conically in a corresponding manner on the external wall at the end 28 of the part 19.

For the installation of the filter cartridges 1, 2 in the housing of the lubricating-oil filter, the two parts 18, 19 of the clip hinge 17 are introduced, with their free ends 21, 22, through the respective internal openings in the end discs 6, 7 so that they embrace, with their detents 23, 24, the internal bent-off circumferential walls 25, 26 of the end discs in a kind of snap connection.

The filter cartridges, which are thus tiltable relative to each other, are then pushed, one after the other, into the housing of the oil filter, for which purpose the height of the available space above the housing may be less than the total length of the two filter cartridges, since the upper filter cartridge 1 can stay tilted, for example, through 90°, relative to the lower filter cartridge 2 until the latter has been fully introduced into the housing. Subsequently, the upper filter cartridge 1 is righted and the two ends 27, 28 of the clip hinge 17 are brought into engagement with each other so that there is formed a fixed connection between the two filter cartridges. The two disc-shaped parts 31, 32 of the clip hinge 17 come into such close abutting contact with each other that there is no need, at this point, for an additional seal for the separation of the filtered and unfiltered compartments.

When the filter cartridges 1, 2 are removed from the housing of the oil filter, first the upper filter cartridge 1 is pulled out as far as the clip hinge 17 and is then tilted around the film hinge 20, and subsequently the second filter cartridge 2 is pulled out further with the aid of the first filter cartridge 1, during which process the connection between the two cartridges is maintained through the clip hinge.

FIG. 3 shows another exemplified embodiment of the invention, wherein the facing end discs 33, 34 of the filter cartridges 1, 2 have, in their central parts 35, 36 which are set back inwardly in a step-like manner, in addition to ports 37, 38 for the lubricating oil flow, further ports 39 and 40 respectively, through which there projects, as the connecting means of the two filter cartridges 1, 2, a wire 42 provided with springy clasps 41. When the wire 42 has been passed through the ports 39, 40, these springy clasps 41 expand and thus ensure a connection of the two filter cartridges. The length of the wire 42 and the distance between the clasps 41 has been chosen to be such that the tilting of the upper filter cartridge relative to the lower filter cartridge through 90° is ensured.

Instead of the above-mentioned wire with springy clasps, there may be used an elastic plastics-material strip which is provided with detents at its ends.

Due to the indicated connecting means, the installation and removal of two filter cartridges in or from an oil filter housing is possible in a simple manner in confined space conditions since the two filter cartridges are always in contact with each other but can be tilted relative to each other.

We claim:

1. Means for connecting at least two filter elements, which are axially arranged in series and are designed as filter cartridges, of a fluid filter, more especially a lubricating-oil filter for internal-combustion engines, characterised in that the connecting means is designed as a joint for tilting the filter cartridges relative to each other during the installation and removal thereof, said connecting means being in the form of a clip hinge made of a plastics-material injection moulding provided with an integrally formed film hinge, said clip hinge engaging with its free ends in the inner ports in the respective end discs of the filter elements, said clip hinge having free ends comprising detents which engage over the end discs of the filter elements, and having two other ends which in the installed position are in operative engagement with each other and comprise conically extending ring sections, which correspond to each other.

2. Means for connecting at least two filter elements, which are axially arranged in series and are designed as filter cartridges, of a fluid filter, more especially a lubricating-oil filter for internal-combustion engines, characterised in that the connecting means is designed as a joint for tilting the filter cartridges relative to each other during the installation and removal thereof, said connecting means being in the form of a wire which passes through the two end discs of the facing front ends of the filter elements and which is provided with clasps at its ends.

3. Means for connecting at least two filter elements, which are axially arranged in series and are designed as filter cartridges, of a fluid filter, more especially a lubricating-oil filter for internal-combustion engines, characterised in that the connecting means is designed as a joint for tilting the filter cartridges relative to each other during the installation and removal thereof, said connecting means being in the form of an elastic plastics-material strip which passes through the two end discs of the facing front ends of the filter elements and which is provided with detents.

* * * * *